United States Patent
Noguchi

(10) Patent No.: US 12,340,134 B2
(45) Date of Patent: Jun. 24, 2025

(54) NON-TRANSITORY COMPUTER-READABLE RECORDING MEDIUM STORING COMPUTER-READABLE INSTRUCTIONS FOR SERVER THAT PROVIDES SERVICE RELATED TO PRINTER, METHOD EXECUTED BY SERVER THAT PROVIDES SERVICE RELATED TO PRINTER, AND SERVER PROVIDING SERVICE RELATED TO PRINTER

(71) Applicant: BROTHER KOGYO KABUSHIKI KAISHA, Nagoya (JP)

(72) Inventor: Sho Noguchi, Mizunami (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 310 days.

(21) Appl. No.: 18/055,865

(22) Filed: Nov. 16, 2022

(65) Prior Publication Data
US 2023/0166519 A1 Jun. 1, 2023

(30) Foreign Application Priority Data
Nov. 26, 2021 (JP) .................................. 2021-192414

(51) Int. Cl.
*G06F 3/12* (2006.01)
*H04N 1/34* (2006.01)

(52) U.S. Cl.
CPC .......... *G06F 3/1288* (2013.01); *G06F 3/1203* (2013.01); *G06F 3/1229* (2013.01); *H04N 1/346* (2013.01)

(58) Field of Classification Search
CPC ...................... G06F 3/1229; H04N 1/34–348
See application file for complete search history.

(56) References Cited

U.S. PATENT DOCUMENTS

| 2010/0268591 | A1* | 10/2010 | Gnanasambandam ...................... G06Q 20/145 705/41 |
| 2017/0063646 | A1 | 3/2017 | Kawai |
| 2020/0079097 | A1* | 3/2020 | Otsuka ................. H04N 1/4413 |
| 2021/0306516 | A1* | 9/2021 | Yamada ................. H04N 1/344 |

(Continued)

FOREIGN PATENT DOCUMENTS

| JP | 2004145804 A | 5/2004 |
| JP | 2017049767 A | 3/2017 |

*Primary Examiner* — Nicholas Pachol
(74) *Attorney, Agent, or Firm* — Scully, Scott, Murphy & Presser, PC

(57) ABSTRACT

A server may receive, from a terminal device, user identification information and a service request for requesting that provision of the service be started and receive, from a printer, cartridge information indicating a type of a cartridge currently attached in the printer. The server may, in a case where the user identification information and the service request are received from the terminal device and the cartridge information indicates a first type of cartridge supplied with the printer at time of sale of the printer, grant a first benefit to a user identified by the user identification information. In a case where the user identification information and the service request are received from the terminal device and the cartridge information indicates a second type of cartridge that was not supplied with the printer at the time of sale of the printer, the first benefit may not be granted.

9 Claims, 8 Drawing Sheets

(56) References Cited

U.S. PATENT DOCUMENTS

2021/0368063 A1* 11/2021 Wong .................... G06F 3/1204
2022/0103717 A1* 3/2022 Yamada ................ G06F 3/1285

* cited by examiner

User Table 238

| User Name | Password | Device ID | Token | Address Information | Payment Information | Contract Plan Information | Applicable Discount Information |
|---|---|---|---|---|---|---|---|
| U1 | PW1 | DV1 | tk1 | AD1 | PI1 | First Plan | DI2 |
| ... | | | | | | | |

Discount Table 240

| Cartridge Condition | Application Condition | Energization Time Condition | Discount Information |
|---|---|---|---|
| Starter | New | Less than Predetermined Time | DI1 (e.g. 4 months + 400 sheets/month) |
| | | Greater Than or Equal to Predetermined Time | DI2 (e.g. 4 months + 200 sheets/month) |
| | Replacement | Less than Predetermined Time | DI3 (e.g. 2 months + 400 sheets/month) |
| | | Greater Than or Equal to Predetermined Time | DI4 (e.g. 2 months + 200 sheets/month) |
| General | New | Less than Predetermined Time | DI5 (e.g. 4 months) |
| | | Greater Than or Equal to Predetermined Time | |
| | Replacement | Less than Predetermined Time | DI6 (e.g. 2 months) |
| | | Greater Than or Equal to Predetermined Time | |

History Table 242

| Device ID | Applicable Discount Information |
|---|---|
| DV1 | DI2 |
| ... | |

FIG. 2

(Continuation of FIG. 6)

NON-TRANSITORY COMPUTER-READABLE RECORDING MEDIUM STORING COMPUTER-READABLE INSTRUCTIONS FOR SERVER THAT PROVIDES SERVICE RELATED TO PRINTER, METHOD EXECUTED BY SERVER THAT PROVIDES SERVICE RELATED TO PRINTER, AND SERVER PROVIDING SERVICE RELATED TO PRINTER

REFERENCE TO RELATED APPLICATIONS

This application claims priority from Japanese Patent Application No. 2021-192414 filed on Nov. 26, 2021. The entire content of the priority application is incorporated herein by reference.

BACKGROUND ART

A communication system including a printer, a PC, and an information management server is known. Every time a flat-rate print process is executed, the printer stores print information related to the number of printed sheets and sends the print information to the information management server. In a case of receiving the print information from the printer, the information management server manages the print information. The information management server provides a service of the flat-rate print process using the print information received from the printer.

DESCRIPTION

The disclosure herein provides novel techniques for granting a benefit to a user.

The disclosure herein discloses a non-transitory computer-readable recording medium storing computer-readable instructions for a server. The server may provide a service related to a printer. The computer-readable instructions, when executed by a processor of the server, may cause the server to: receive, from a terminal device, user identification information and a service request for requesting that provision of the service be started; receive, from the printer, cartridge information indicating a type of a cartridge currently attached in the printer; in a case where the user identification information and the service request are received from the terminal device and the cartridge information indicates a first type of cartridge supplied with the printer at time of sale of the printer, grant a first benefit to a user identified by the user identification information, wherein in a case where the user identification information and the service request are received from the terminal device and the cartridge information indicates a second type of cartridge that was not supplied with the printer at the time of sale of the printer, the first benefit is not granted.

According to the configuration above, the server grants the first benefit to the user in the case of receiving from the printer the cartridge information that indicates the first type of cartridge supplied with the printer at the time of sale of the printer. To the contrary, the server does not grant the first benefit to the user in the case of receiving from the printer the cartridge information that indicates the second type of cartridge which was not supplied with the printer at the time of sale of the printer. Thus, the server can select whether the first benefit is to be granted to the user or not depending on the type of cartridge currently attached in the printer.

The above computer-readable instructions, a server implemented by the computer-readable instructions, and a method executed by the above server are also novel and useful. A communication system comprising the above server and printer is also novel and useful.

FIG. 2 illustrates examples of tables.

Figure 1:
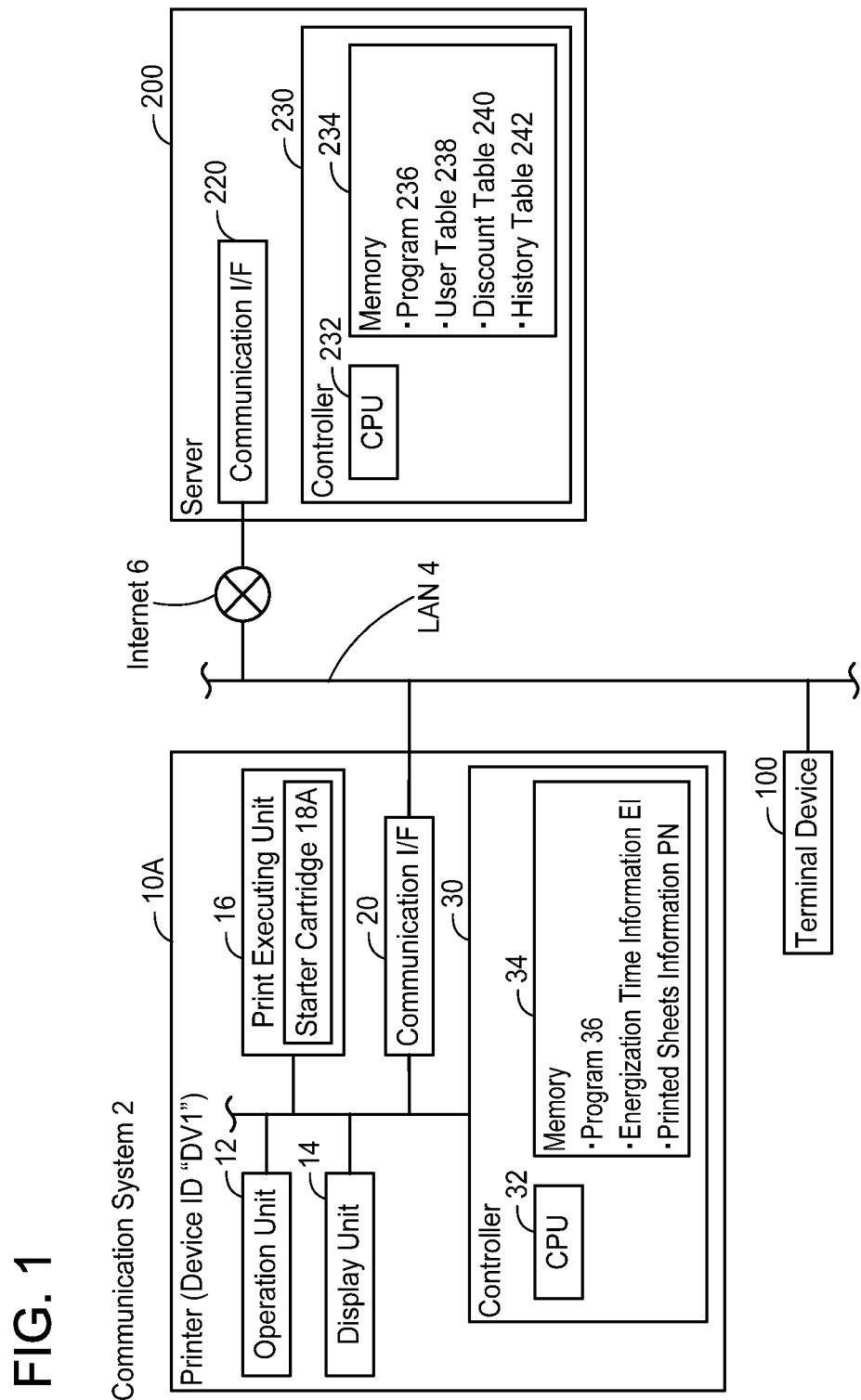
FIG. 1 illustrates a configuration of a communication system.

EMBODIMENTS (Configuration of Communication System 2; FIG. 1)

As illustrated in FIG. 1, a communication system 2 comprises a printer 10A, a terminal device 100, and a server 200. The terminal device 100 is a portable terminal device such as a cell-phone (e.g., a smartphone), a PDA, a tablet PC, or the like. The printer 10A and the terminal device 100 are connected to a LAN (local area network) 4. The printer 10A and the terminal device 100 are communicable with each other via the LAN 4. The LAN 4 is connected to the Internet 6. The printer 10A, the terminal device 100, and the server 200 are connected to the Internet 6. The printer 10A, the terminal device 100, and the server 200 are communicable with each other via the Internet 6. The server 200 provides a flat-rate charging service related to printer (termed "flat-rate service" hereinafter) and an automatic ordering service. The flat-rate service and the automatic ordering service will be described later in detail.

(Configuration of Printer 10A)

The printer 10A is a peripheral device (i.e., a peripheral device of a PC, etc.) configured to execute a print function. The printer 10A may be a multifunctional device configured to execute a scan function, a FAX function, and/or the like in addition to the print function. The printer 10A comprises an operation unit 12, a display unit 14, a print executing unit 16, a communication interface 20, and a controller 30. A device ID "DV1" for identifying the printer 10A is assigned to the printer 10A. Hereinafter, interface will be abbreviated as "I/F".

The operation unit 12 comprises a plurality of keys. A user can input various instructions to the printer 10A by operating the operation unit 12. The display unit 14 is a display for displaying various information.

The print executing unit 16 is a print mechanism of inkjet scheme. A cartridge containing ink is attached to the print executing unit 16. The print executing unit 16 executes printing by using the ink in the cartridge. Cartridge numbers for identifying cartridges are assigned to cartridges. The cartridge numbers are unique character strings assigned to respective cartridges during manufacture of the cartridges. There are the starter cartridge that can be purchased at distribution outlets and is packaged with printers at the time of sale of the printers, the general cartridge that can be purchased at distribution outlets but is not packaged with printers at the time of sale of the printers, and dedicated cartridges that cannot be purchased at distribution outlets and are shipped from the server 200. Memories (IC chips) storing cartridge information (cartridge numbers) are attached to respective cartridges. By reading the cartridge information (cartridge number) from the memory of the cartridge, the printer 10A can specify which of the starter cartridge, the general cartridge, and the dedicated cartridge the cartridge currently attached in the printer 10A is.

The communication I/F 20 is connected to the LAN 4. The communication I/F 20 may be a wireless I/F or a wired I/F.

The controller 30 comprises a CPU 32 and a memory 34. The CPU 32 executes various processes in accordance with a program 36 stored in the memory 34. The memory 34 is configured of a volatile memory, a non-volatile memory, etc. The memory 34 further stores energization time information EI and printed sheets information PN. The energization time information EI indicates an accumulated energization time since the printer 10A was initially turned on. The printed sheets information PN indicates the number of sheets printed by using the starter cartridge or the dedicated cartridge while the printer 10A is under provision of the flat-rate service.

(Configuration of Server 200)

The server 200 is set up on the Internet 6 by the vendor of the printer 10A. In a variant, the server 200 may be set up on the Internet 6 by a business entity different from the vendor. In another variant, the vendor of the printer 10A may use an environment provided by an external cloud computing service, without preparing hardware of the server 200 themselves. In this instance, the vendor of the printer 10A may implement the server 200 by preparing a program (i.e., software) for the server 200 and introducing it to the environment. As described, the server 200 provides the flat-rate service and the automatic ordering service. The flat-rate service is a service that charges a predetermined amount (which may be termed "flat-rate fee" hereinafter) if the number of printed sheets within a predetermined time period (e.g., a month) is less than or equal to the contracted number of sheets (e.g., 1000 sheets) and charges a total amount of the flat-rate fee and an amount that is determined based on the exceeded number of printed sheets beyond the contracted number of sheets (which may be termed "additional fee" hereinafter) if the number of printed sheets within the predetermined time period exceeds the contracted number of sheets. The flat-rate service in the present embodiment provides two contract plans, namely a first plan and a second plan. The first plan is for users who use relatively small number of sheets for printing within the predetermined time period, while the second plan is for users who use relatively large number of sheets for printing within the predetermined time period. For example, in the first plan, the contracted number of sheets is 500 sheets and a pay-per-use fee for the exceeded number of printed sheets beyond the contracted number of sheets within the predetermined time period is 0.02 ($/sheet). In the second plan, the contracted number of sheets is 1500 sheets and a pay-per-use fee for the exceeded number of printed sheets beyond the contracted number of sheets within the predetermined time period is 0.01 ($/sheet). The automatic ordering service is a service that automatically ships a new dedicated cartridge when a remaining amount of ink in a dedicated cartridge currently attached on the print executing unit 16 of the printer 10A becomes less than or equal to a predetermined remaining amount. In a variant, the server 200 may provide a pay-per-use charging service that charges an amount determined based on the number of printed sheets within a predetermined time period (e.g., a month), instead of the flat-rate service.

The server 200 comprises a communication I/F 220 and a controller 230. The communication I/F 220 is connected to the Internet 6. The controller 230 comprises a CPU 232 and a memory 234. The CPU 232 executes various processes in accordance with a program 236 stored in the memory 234. The memory 234 is configured of a volatile memory, a non-volatile memory, etc. The memory 234 further stores a user table 238, a discount table 240, and a history table 242.

(Configurations of Tables; FIG. 2)

Referring to FIG. 2, contents of the user table 238, the discount table 240, and the history table 242 in the server 200 will be described.

The user table 238 is a table for managing information on user(s). In the user table 238, a user name for identifying a user, a password, a device ID, a token, address information indicating an address of the user, payment information, contract plan information indicating a contracted plan, and applicable discount information indicating a discount to be granted to the user are stored in association with each other. The token is authentication information for establishing an XMPP (tensible Messaging and Presence Protocol) connection with the server 200. The payment information is information on fee payment (e.g., a credit card number).

The discount table 240 is a table for specifying a discount to be granted to each user who applied for the first plan of the flat-rate service. In the discount table 240, a cartridge condition, an application condition, an energization time condition, and discount information are stored in association with each other. The cartridge conditions are conditions corresponding to types of cartridges attached in printers. Depending on whether the cartridge condition is "starter", indicating the type of cartridge is the starter cartridge, or "general", indicating the type of cartridge is the general cartridge, a discount to be granted to the user is selected. The application conditions are conditions corresponding to states of applications for the flat-rate service. Depending on whether the application condition is "new", indicating an initial application for the flat-rate service, or "replacement", indicating a second or subsequent application for the flat-rate service due to replacing an old printer with a new printer ("printer replacement") a discount to be granted to the user is selected. The energization time conditions are conditions corresponding to accumulated energization times of printer. Depending on whether the energization time condition indicates that the accumulated energization time of printer is less than a first predetermined time (e.g., "240 hours") or that the accumulated energization time of printer is greater than or equal to the first predetermined time, a discount to be granted to the user is selected. Discount information DI1 to DI6 are information indicating discounts to be granted to users. The discount information DI1 to DI4 each include discount period information that indicates a time period for which the flat-rate fee is not charged (e.g., "4 months", "2 months") and discount sheet information that indicates the number of sheets that can be used for free (e.g., "400 sheets/month", "200 sheets/month") when the number of printed sheets exceeds the contracted number of sheets within the free-of-charge period. The discount information DI5 and DI6 each include only the discount period information that indicates a time period for which the flat-rate fee is not charged (e.g., "4 months", "2 months"). Hereinafter, discounts corresponding to the discount information DI1 to DI6 may be termed "first discount" to "sixth discount". The memory 234 of the server 200 also stores a discount table for specifying a discount to be granted to each user who applied for the second plan of the flat-rate service, although this is not illustrated.

The history table 242 is a table for managing discount history. In the history table 242, a device ID and applicable discount information are stored in association with each other.

(Specific Cases; FIGS. 3 to 8)

Referring to FIGS. 3 to 8, specific cases A to D implemented by the communication system 2 according to the present embodiment will be described.

Figure 3:
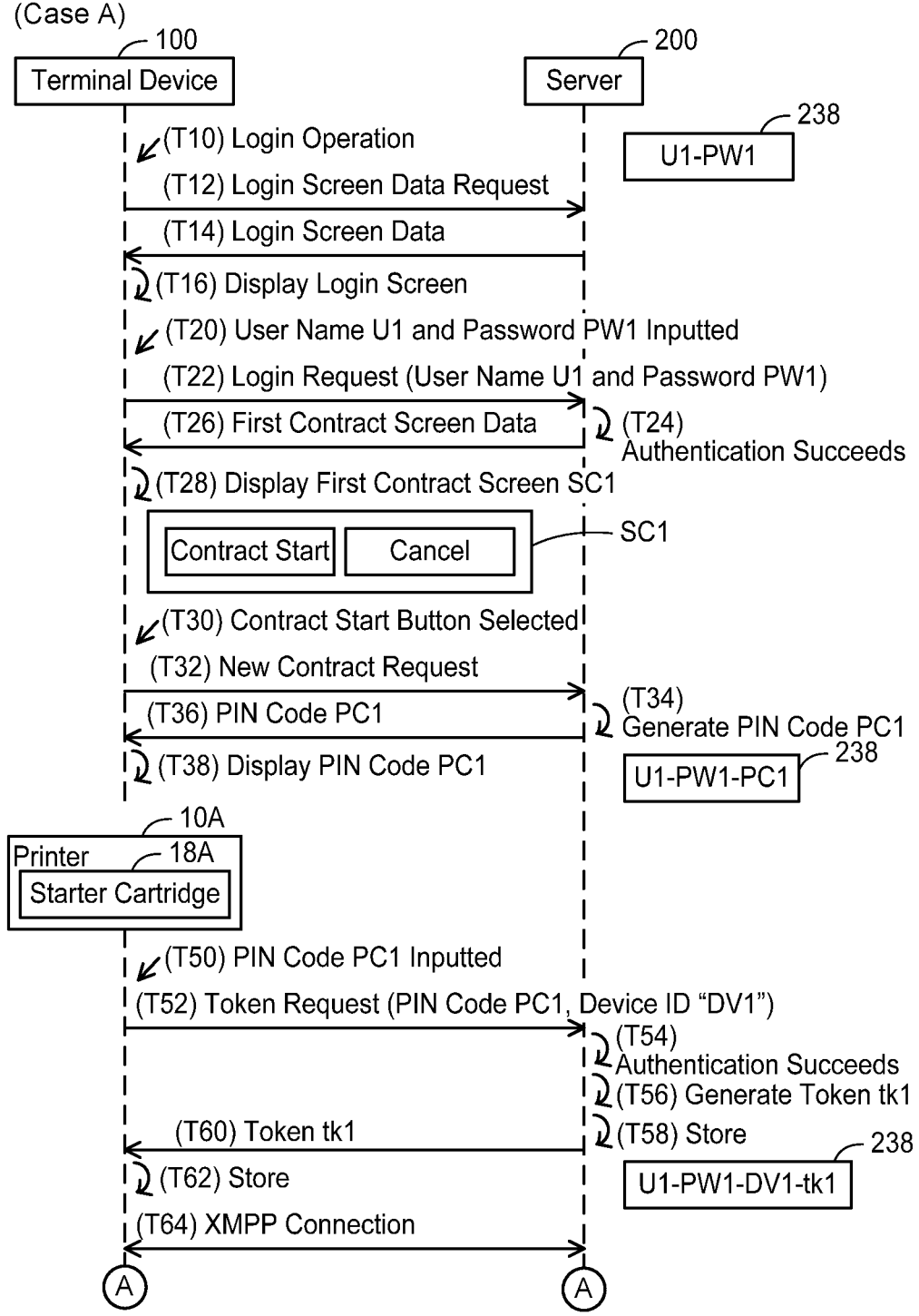
FIG. 3 illustrates a sequence of Case A in which an initial application for a flat-rate service is made while a starter cartridge is attached in a printer.
Figure 4:
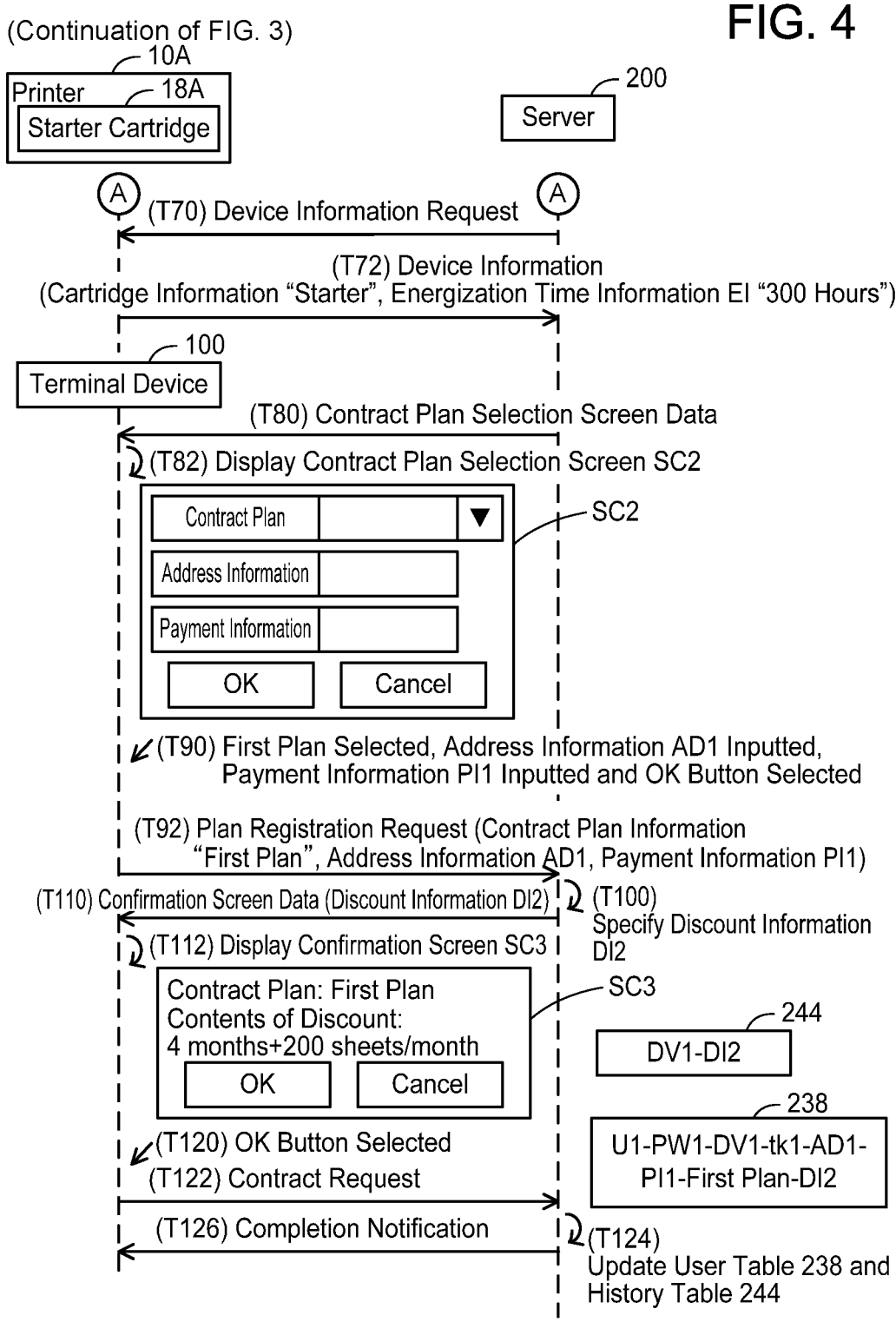
FIG. 4 illustrates a sequence continued from FIG. 3.

(Case A; FIGS. 3 and 4)

Referring to FIG. 3, Case A will be described. In Case A, an initial application for the flat-rate service is made while a starter cartridge 18A, which was packaged with the printer 10A at the time of sale of the printer 10A, is attached in the printer 10A. In an initial state of Case A, a user name U1 and a password PW1 are stored in association with each other in the user table 238 of the server 200. The history table 242 of the server 200 is blank.

When the terminal device 100 accepts a login operation in T10, the terminal device 100 sends a login screen data request to the server 200 in T12, receives login screen data from the server 200 in T14, and displays a login screen in T16. Then, when the terminal device 100 accepts input of the user name U1 and the password PW1 in the login screen in T20, the terminal device 100 sends a login request including the user name U1 and the password PW1 to the server 200 in T22.

When receiving the login request from the terminal device 100 in T22, the server 200 determines in T24 that user authentication is successful because the combination of the user name U1 and the password PW1 in the login request is in the user table 238, determines that contract plan information associated with the user name U1 in the user table 238 is blank, and sends first contract screen data to the terminal device 100 in T26.

When receiving the first contract screen data from the server 200 in T26, the terminal device 100 displays in T28 a first contract screen SC1 corresponding to the first contract screen data. The first contract screen SC1 includes a contract start button and a cancel button. When accepting selection of the contract start button in T30, the terminal device 100 sends a new contract request to the server 200 in T32. The new contract request is a signal that is for requesting a contract for the flat-rate service and indicates an initial application for the flat-rate service.

When receiving the new contract request from the terminal device 100 in T32, the server 200 generates a PIN code PC1 and temporarily stores the PIN code PC1 in the user table 238 in association with the user name U1 in T34. Then, the server 200 sends the PIN code PC1 to the terminal device 100 in T36.

When receiving the PIN code PC1 from the server 200 in T36, the terminal device 100 displays the PIN code PC1 in T38. Thus, the user is able to know the PIN code PC1 to be inputted to the printer 10A.

When the printer 10A accepts input of the PIN code PC1 in T50, the printer 10A sends a token request including the PIN code PC1 and the device ID "DV1" of the printer 10A to the server 200 in T52.

When receiving the token request from the printer 10A in T52, the server 200 determines in T54 that authentication is successful because the PIN code PC1 stored in T34 matches the PIN code PC1 in the token request. Then, the server 200 generates a token tk1 in T56 and stores the received device ID "DV1" and the generated token tk1 in the user table 238 in association with the user name U1 in T58. Further, the server 200 deletes the PIN code PC1 in the user table 238. The server 200 then sends the token tk1 to the printer 10A in T60.

When receiving the token tk1 from the server 200 in T60, the printer 10A stores the received token tk1 in the memory 34 in T62. Then, the printer 10A establishes an XMPP connection with the server 200 in T64 by using the token tk1. The XMPP connection is a so-called constant connection and is maintained until the printer 10A is turned off. By using the XMPP connection, the server 200 can send requests to the printer 10A beyond a firewall of the LAN 4 where the printer 10A belongs, without receiving requests from the printer 10A. The means used to send requests from the server 200 to the printer 10A is not limited to the XMPP connection but may be another means. For example, an HTTPS (Hypertext Transfer Protocol Secure) connection may be established between the printer 10A and the server 200.

When the XMPP connection is established with the printer 10A in T64, the server 200 sends a device information request to the printer 10A in T70 of FIG. 4. The device information request is a signal for requesting that cartridge information indicating the type of cartridge currently attached in the printer 10A and the energization time information EI be sent.

When receiving the device information request from the server 200 in T70, the printer 10A specifies that the type of the starter cartridge 18A is "starter" by using the cartridge number of the starter cartridge 18A. Then, the printer 10A sends device information including the cartridge information "starter" and the energization time information EI ("300 hours") to the server 200 in T72.

When receiving the device information from the printer 10A in T72, the server 200 sends contract plan selection screen data to the terminal device 100 in T80.

When receiving the contract plan selection screen data from the server 200 in T80, the terminal device 100 displays a contract plan selection screen SC2 in T82. The contract plan selection screen SC2 includes a contract plan selection box for selection of a contract plan, an address information input box for input of address information, a payment information input box for input of payment information, an OK button, and a cancel button. When accepting selection of the first plan, input of address information AD1, input of payment information PI1, and selection of the OK button in T90, the terminal device 100 sends a plan registration request including contract plan information "first plan", the address information AD1, and the payment information PI1 to the server 200 in T92.

When receiving the plan registration request from the terminal device 100 in T92, the server 200 specifies a discount to be granted to the user by using the discount table 240. The server 200 specifies that this is an initial application for the flat-rate service since having received the new contract request (see T32 in FIG. 3). The server 200 also specifies that the type of cartridge indicated by the received cartridge information is "starter" and the energization time "300 hours" indicated by the received energization time information EI is greater than or equal to a first predetermined time (e.g., 240 hours). In this instance, the server 200 specifies, in the discount table 240, the discount information DI2, which is associated with the cartridge condition "starter", the application condition "new", and the energization time condition "greater than or equal to the first predetermined time", as the applicable discount information to be granted to the user in T100. Then, the server 200 sends confirmation screen data including the discount information DI2 to the terminal device 100 in T110.

When receiving the confirmation screen data from the server 200 in T110, the terminal device 100 displays a confirmation screen SC3 corresponding to the confirmation screen data in T112. The confirmation screen SC3 includes information indicating the contract plan selected by the user, information indicating contents of the discount applicable to the user, an OK button, and a cancel button. In the present case, "first plan" and "4 months+200 sheets/month" are displayed in the confirmation screen SC3. Thus, the user is able to know the contents of discount applicable to the user. When accepting selection of the OK button in T120, the terminal device 100 sends a contract request to the server 200 in T122.

When receiving the contract request from the terminal device 100 in T122, the server 200 updates the user table 238 and the history table 242 in T124. Specifically, the server 200 stores the address information AD1, the payment information PI1, the contract plan information "first plan", and the applicable discount information DI2 in the user table 238 in association with the user name U1. Further, the server 200 stores the device ID "DV1" and the applicable discount information DI2 in association with each other in the history table 242. As a result, the second discount corresponding to the discount information DI2 is granted to the user. Then, the server 200 sends a completion notification indicating that the contract has been closed to the terminal device 100 in T126. Thus, the user is now able to receive the flat-rate service provided by the server 200. Thereafter, the server 200 ships a dedicated cartridge to the user of the printer 10A. The printer 10A stores the number of sheets printed by using the starter cartridge or the dedicated cartridge as the printed sheets information PN and sends the printed sheets information PN to the server 200 every second predetermined time (e.g., 24 hours). After a predetermined time (e.g., a month), the server 200 specifies an amount to be charged to the user. The server 200 specifies the number of printed sheets within the predetermined time by using the printed sheets information PN received from the printer 10A and determines whether the specified number of printed sheets is no greater than the contracted number of sheets. When the specified number of printed sheets is less than or equal to the contracted number of sheets, the server 200 charges the flat-rate fee to the user of the printer 10A as a charging amount, by using the payment information PI1 in the user table 238. To the contrary, when the specified number of printed sheets exceeds the contracted number of sheets, the server 200 specifies an additional fee for the printed sheets exceeding beyond the contracted number of sheets and charges the total amount of the flat-rate fee and the additional fee to the user of the printer 10A as a charging amount, by using the payment information PI1. In the present case, the discount "4 months+200 sheets/month" is granted to the user. Therefore, the server 200 does not charge the flat-rate fee to the user for the free-of-charge period (4 months). Also, the server 200 does not charge the additional fee to the user when the number of printed sheets exceeding beyond the contracted number of sheets is 200 or less within the free-of-charge period (4 months). When the number of printed sheets exceeding beyond the contracted number of sheets is greater than 200 within the free-of-charge period (4 months), the server 200 subtracts the contracted number of sheets (e.g., "1000", "200") from the number of actually printed sheets within the predetermined period to specify a charging number of printed sheets that indicates the number of printed sheets for which an amount is to be charged. Then, the server 200 charges a fee corresponding to the specified charging number of printed sheets to the user as a charging amount.

Figure 5:
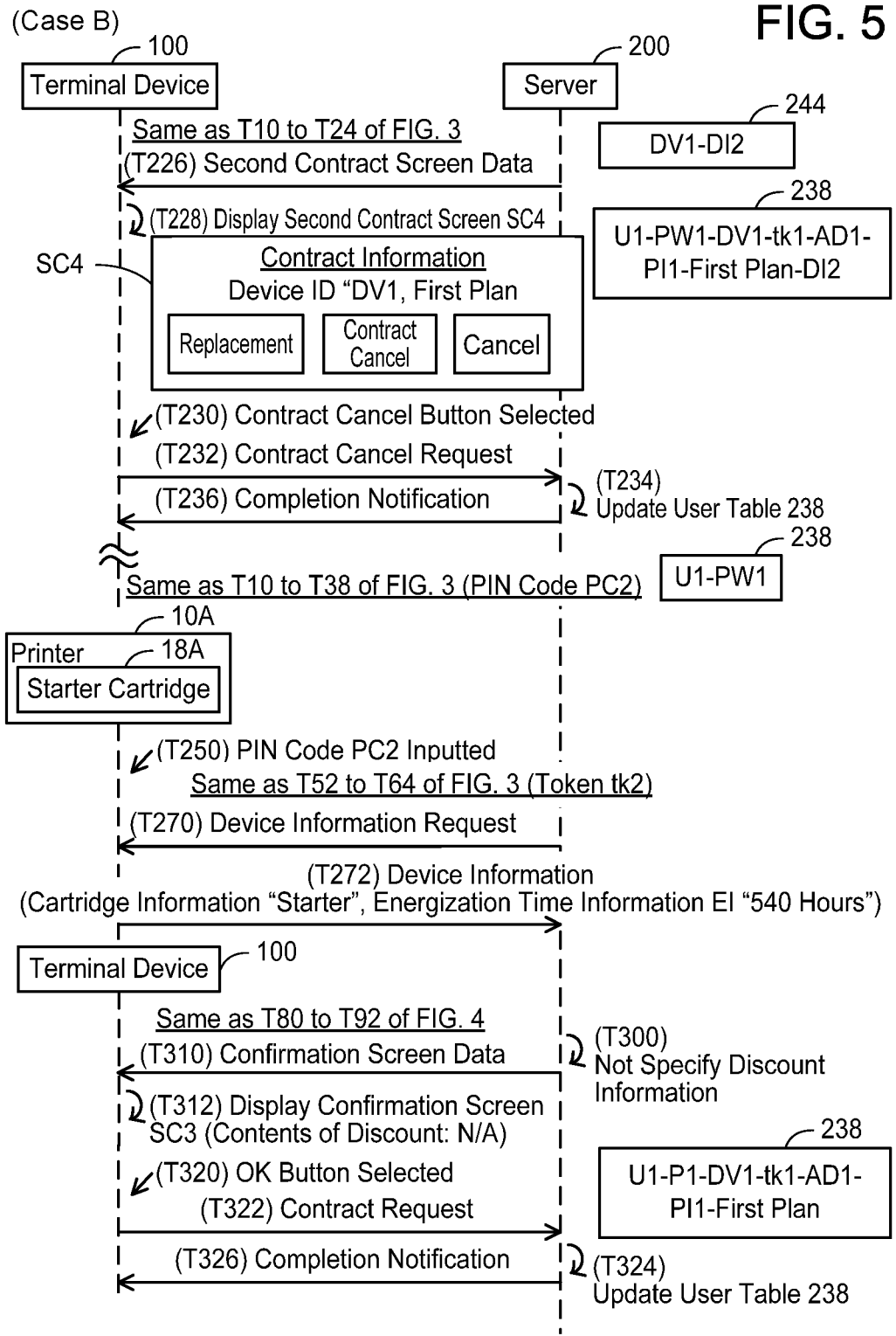
FIG. 5 illustrates a sequence of Case B in which a second application for the flat-rate service is made while the starter cartridge is attached in the printer.

(Case B; FIG. 5)

Referring to FIG. 5, Case B will be described. In Case B, an application for the flat-rate service is made again after the contract to receive provision of the flat-rate service has been cancelled. In Case B, the second or subsequent application for the flat-rate service is made not due to printer replacement. An initial state of Case B is the state after Case A in FIG. 4. Thus, in the user table 238 of the server 200, the user name U1, the password PW1, the device ID "DV1", the token tk1, the address information AD1, the payment information PI1, the contract plan information "first plan", and the applicable discount information DI2 are stored in association with each other. Further, in the history table 242 of the server 200, the device ID "DV1" and the applicable discount information DI2 are stored in association with each other. First, the same sequence as T10 to T24 in FIG. 3 is executed between the terminal device 100 and the server 200. In the present case, the server 200 determines that the contract plan information "first plan" is associated with the user name U1 in the user table 238 and sends second contract screen data to the terminal device 100 in T226.

When receiving the second contract screen data from the server 200 in T226, the terminal device 100 displays a second contract screen SC4 corresponding to the second contract screen data in T228. The second contract screen SC4 includes information related to the current contract (e.g., the device name "DV1", the contract plan information "first plan"), a replacement button, a contract cancel button, and a cancel button. The replacement button is a button for applying for the flat-rate service after the user replaced the printer, by using the new printer. The contract cancel button is a button for cancelling the contract. When accepting selection of the contract cancel button in T230, the terminal device 100 sends a contract cancel request for requesting cancel of the contract to the server 200 in T232.

When receiving the contract cancel request from the terminal device 100 in T232, the server 200 updates the user table 238 in T234. Specifically, the server 200 deletes the device ID "DV1", the token tk1, the address information AD1, the payment information PI1, the contract plan information "first plan", and the applicable discount information DI2 which are associated with the user name U1 in the user table 238. Then, the server 200 sends a completion notification for notifying that the contract has been cancelled to the terminal device 100 in T236.

In the present case, the user reapplies for the flat-rate service. In this instance, a sequence similar to T10 to T38 in FIG. 3 is executed between the terminal device 100 and the server 200. In the present case, the server 200 generates in T34 a PIN code PC2 different from the PIN code PC1.

The printer 10A accepts input of the PIN code PC2 in T250. In this instance, a sequence similar to T52 to T64 in FIG. 3 is executed between the printer 10A and the server 200. In the present case, the server 200 generates in T56 a token tk2 different from the token tk1. T270 is the same as T70 in FIG. 4. T272 is the same as T72 except that the energization time indicated by the energization time information EI in the device information is "540 hours".

Then, the same sequence as T80 to T92 in FIG. 4 is executed between the terminal device 100 and the server 200. In T300, the server 200 does not specify a discount to be granted to the user because the applicable discount information DI2 is associated with the device ID "DV1" in the history table 242. In this instance, the server 200 sends confirmation screen data that does not include discount information to the terminal device 100 in T310.

When receiving the confirmation screen data from the server 200 in T310, the terminal device 100 displays a confirmation screen SC3 corresponding to the confirmation screen data in T312. The confirmation screen SC3 displayed in the present case is the same as the confirmation screen SC3 in FIG. 4 except that information indicating that a discount is not applicable ("N/A") is displayed as the information indicating the contents of discount applicable to the user. T320 and T322 are the same as T120 and T122.

When receiving the contract request from the terminal device 100 in T322, the server 200 stores the address information AD1, the payment information PI1, and the contract plan information "first plan" in association with the user name U1 in the user table 238 in T324. Then, the server 200 sends a completion notification indicating that the contract has been closed to the terminal device 100 in T326. Thus, the user is now able to receive the flat-rate service provided by the server 200.

(Effects of Case B)

As illustrated in Case A of FIG. 4, the server 200 grants the second discount to the user when the applicable discount information is not associated with the device ID "DV1" in the history table 242 (T124 in FIG. 4). On the other hand, as illustrated in Case B of FIG. 5, the server 200 does not grant the second discount to the user when the applicable discount information DI2 is associated with the device ID "DV1" in the history table 242 (T324 in FIG. 5). Such a configuration can suppress a discount from being granted multiple times to a user using the same printer.

Figure 6:
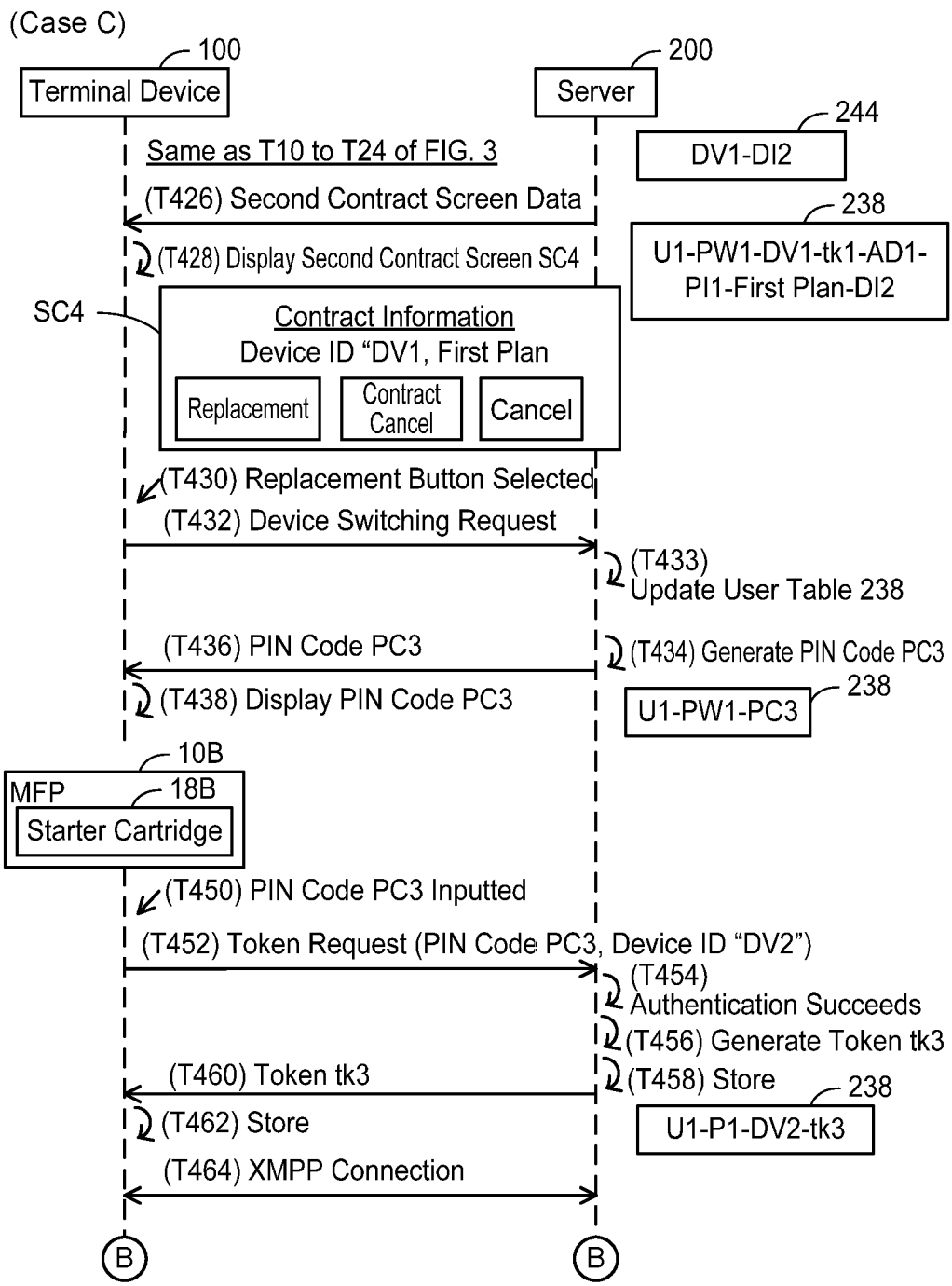
FIG. 6 illustrates a sequence of Case C in which an application for the flat-rate service is made after purchase of a new printer.
Figure 7:
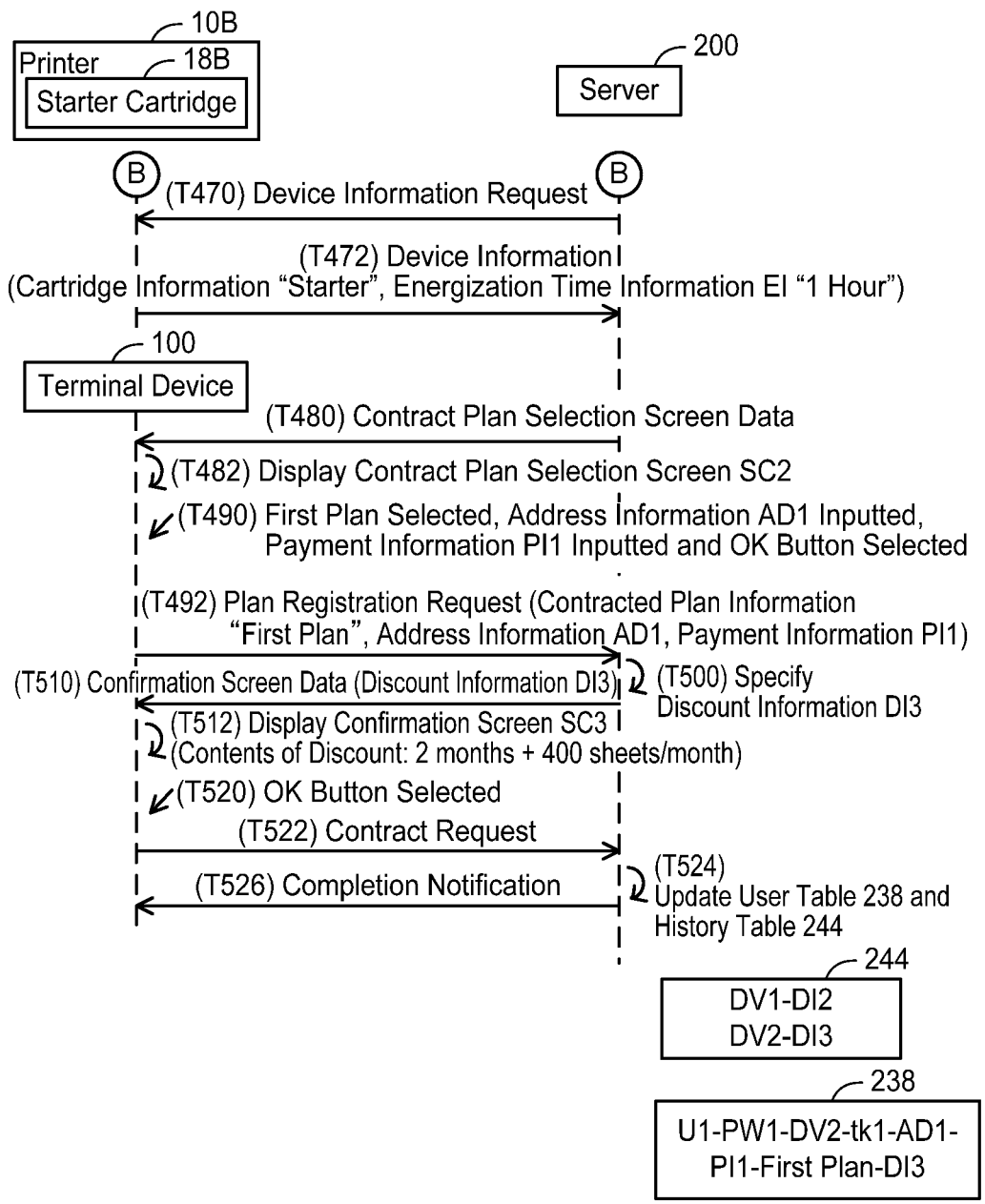
FIG. 7 illustrates a sequence continued from FIG. 6.

(Case C; FIGS. 6, 7)

Referring to FIGS. 6 and 7, Case C will be described. In Case C, after the printer 10A has been replaced with a printer 10B, an application for the flat-rate service is made while a starter cartridge 18B which was packaged with the printer 10B at the time of sale of the printer 10B is attached in the printer 10B. The printer 10B has the same configuration as that of the printer 10A except that the printer 10B has a device ID "DV2". An initial state of Case C is the same as the initial state of Case B in FIG. 5.

First, the same sequence as T10 to T24 in FIG. 3 is executed between the terminal device 100 and the server 200. T426 and T428 are the same as T226 and T228 in FIG. 5, respectively. When accepting selection of the replace button in T430, the terminal device 100 sends the server 200 a device switching request for requesting that the device receiving provision of the flat-rate service be changed in T432. T433 is the same as T234 in FIG. 5. T434 to T438 are the same as T34 to T38 in FIG. 3 except that a PIN code PC3 is used.

When accepting input of the PIN code PC3 in T450, the printer 10B sends a token request including the PIN code PC3 and the device ID "DV2" of the printer 10B to the server 200 in T452.

When receiving the token request from the printer 10B in T452, the server 200 determines in T454 that authentication is successful because the PIN code PC3 stored in T434 matches the PIN code PC3 in the token request, generates a token tk3 in T456, and stores the received device ID "DV2" and the generated token tk3 in association with the user name U1 in the user table 238 in T458. T460 to T464 are the same as T60 to T64 in FIG. 3 except that the token tk3 is used.

When receiving a device information request from the server 200 in T470 of FIG. 7, the printer 10B specifies that the type of the starter cartridge 18B currently attached in the printer 10B is "starter" by using the cartridge number of the starter cartridge 18B. Then, the printer 10B sends device information including cartridge information "starter" and energization time information EI ("1 hour") to the server 200 in T472.

T480 to T492 are the same as T80 to T92 in FIG. 4. The server 200 specifies a discount to be granted to the user by using the discount table 240. Since the server 200 has received the device switching request (see T432 in FIG. 6), the server 200 specifies that this is a second or subsequent application for the flat-rate service due to printer replacement (i.e., "replacement"). Further, the server 200 specifies that the type of cartridge indicated by the received cartridge information is "starter" and the energization time "1 hour" indicated by the received energization time information EI is less than the first predetermined time (e.g., "240 hours"). In this instance, the server 200 specifies the discount information DI3, which is associated with the cartridge condition "starter", the application condition "replacement", and the energization time condition "less than the first predetermined time" in the discount table 240, as applicable discount information in T500. Then, the server 200 sends confirmation screen data including the discount information DI3 to the terminal device 100 in T510.

When receiving the confirmation screen data from the server 200 in T510, the terminal device 100 displays a confirmation screen SC3 corresponding to the confirmation screen data in T512. The confirmation screen SC3 displayed in the present case is the same as the confirmation screen SC3 in FIG. 4 except that "2 months+400 sheets/month" is displayed as the information indicating the contents of discount applicable to the user. T520 and T522 are the same as T120 and T122.

When receiving the contract request from the terminal device 100 in T522, the server 200 updates the user table 238 and the history table 242 in T524. Specifically, the server 200 stores the address information AD1, the payment information PI1, the contract plan information "first plan", and the applicable discount information DI3 in association with the user name U1 in the user table 238. Further, the server 200 stores the device ID "DV2" and the applicable discount information DI3 in association with each other in the history table 242. As a result, the third discount corresponding to the applicable discount information DI3 is granted to the user. T526 is the same as T126 in FIG. 4.

(Effects of Case C)

As illustrated in Case A in FIGS. 3 and 4, the server 200 applies the second discount to the user when the time indicated by the energization time information EI is greater than or equal to the first predetermined time (T124 in FIG. 4). On the other hand, as illustrated in Case C in FIGS. 6 and 7, the server 200 applies the third discount to the user when the time indicated by the energization time information EI is less than the first predetermined time (T524 in FIG. 7). Regarding the discount sheet information of the discount information, the discount "400 sheets/month" which is granted when the energization time is less than the first predetermined time is larger than the discount "200 sheets/month" which is granted when the energization time is greater than or equal to the first predetermined time. Shorter energization time highly likely means that an application for the flat-rate service was made relatively soon after the purchase of the printer. The configuration above allows a larger discount to be granted to a user who applied for the flat-rate service relatively early after the purchase of printer.

As illustrated in Case A in FIGS. 3 and 4, the server 200 applies the second discount to the user when the application is the initial application for the flat-rate service (T124 in FIG. 4). On the other hand, as illustrated in Case C in FIGS. 6 and 7, the server 200 applies the third discount to the user when the application is the second application for the flat-rate service due to printer replacement (T524 in FIG. 7). Regarding the discount period information of the discount information, the discount "4 months" which is granted when the application is the initial application for the flat-rate service is larger than the discount "2 months" which is granted when the application is the second application for the flat-rate service due to printer replacement. Such a configuration allows a larger discount to be granted to a user who applied for the flat-rate service for the first time.

Figure 8:
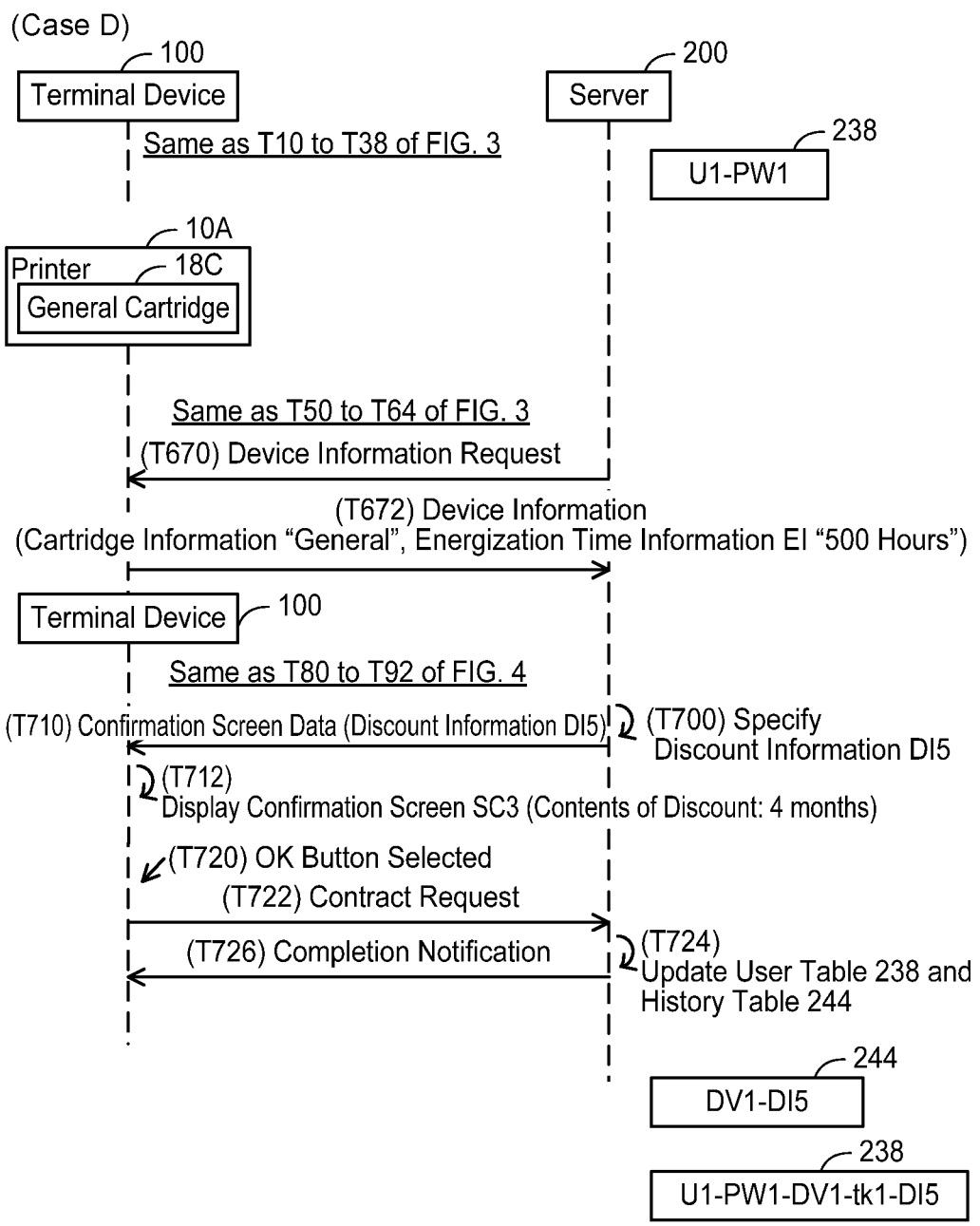
FIG. 8 illustrates a sequence of Case D in which an initial application for the flat-rate service is made while a general cartridge is attached in the printer.

(Case D; FIG. 8)

Referring to FIG. 8, Case D will be described. In Case D, an initial application for the flat-rate service is made while a general cartridge 18C which was not packaged with the printer 10A at the time of sale of the printer 10A is attached in the printer 10A. An initial state of Case D is the same as the initial state of Case A in FIGS. 3 and 4 except that the general cartridge 18C is attached on the print executing unit 16 of the printer 10A and the energization time information EI ("500 hours") is different.

First, the same sequence as T10 to T38 in FIG. 3 is executed between the terminal device 100 and the server 200. Then, the same sequence as T50 to T64 in FIG. 3 is executed between the printer 10A and the server 200. When receiving a device information request from the server 200 in T670, the printer 10A specifies that the type of the general cartridge 18C is "general" by using the cartridge number of the general cartridge 18C. Then, the printer 10A sends device information including cartridge information "general" and energization time information EI ("500 hours") to the server 200 in T672.

Then, the same sequence as T80 to T92 in FIG. 4 is executed between the terminal device 100 and the server 200. The server 200 specifies a discount to be granted to the user by using the discount table 240. The server 200 specifies that this is an initial application for the flat-rate service (i.e., "new") since the server 200 has received the new contract request (see T32 in FIG. 3). Further, the server 200 specifies that the type of cartridge indicated by the received cartridge information is "general" and the energization time "500 hours" indicated by the received energization time information EI is greater than or equal to the first predetermined time (e.g., "240 hours"). In this instance, the server 200 specifies the discount information DI5, which is associated with the cartridge condition "general", the application condition "new", and the energization time condition "greater than or equal to the first predetermined time" in the discount table 240, as applicable discount information in T700. Then, the server 200 sends confirmation screen data including the discount information DI5 to the terminal device 100 in T710.

When receiving the confirmation screen data from the server 200 in T710, the terminal device 100 displays a confirmation screen SC3 corresponding to the confirmation screen data in T712. The confirmation screen SC3 displayed in the present case is the same as the confirmation screen SC3 in FIG. 4 except that "4 months" is displayed as the information indicating the contents of discount applicable to the user. T720 and T722 are the same as T120 and T122.

When receiving the contract request from the terminal device 100 in T722, the server 200 updates the user table 238 and the history table 242 in T724. Specifically, the server 200 stores the address information AD1, the payment information PI1, the contract plan information "first plan", and the applicable discount information DI5 in association with the user name U1 in the user table 238. Further, the server 200 stores the device ID "DV1" and the applicable discount information DI5 in association with each other in the history table 242. As a result, the fifth discount corresponding to the applicable discount information DI5 is granted to the user. T726 is the same as T126 in FIG. 4.

(Effects of Case D)

As illustrated in Case A in FIGS. 3 and 4, the server 200 applies the second discount to the user when the cartridge information is "starter" indicating the starter cartridge packaged with the printer at the time of sale of the printer (T124 in FIG. 4). On the other hand, as illustrated in Case D in FIG. 8, the server 200 applies the fifth discount to the user when the cartridge information is "general" indicating the general cartridge which was not packaged with the printer at the time of sale of the printer (T724 in FIG. 4). The second discount granted when the cartridge information indicates "starter" includes the discount corresponding to the discount sheet information, whereas the fifth discount granted when the cartridge information indicates "general" does not include a discount corresponding to the discount sheet information. That is, regarding the discount sheet information of the discount information, the discount granted when the cartridge information indicates "starter" is larger than the discount granted when the cartridge information indicates "general". Generally, the user first uses the starter cartridge packaged with the printer at the time of sale of the printer, and thereafter uses the general cartridge. That is, the cartridge information indicating "starter" highly likely means that an application for the flat-rate service was made relatively soon after the purchase of the printer. The configuration above allows a larger discount to be granted to a user who applied for the flat-rate service relatively soon after the purchase of printer.

(Effects of Present Embodiment)

According to the configuration above, the server 200 grants one of the first to fourth discounts to the user in the case of receiving from the printer 10A the cartridge information "starter" indicating the starter cartridge packaged with the printer 10A at the time of sale of the printer 10A. On the other hand, the server 200 does not grant any of the first to fourth discounts in the case of receiving from the printer 10A the cartridge information "general" indicating the general cartridge that was not packaged with the printer 10A at the time of sale of the printer 10A. As above, the server 200 can select whether or not to grant one of the first to fourth discounts to the user depending on the type of cartridge currently attached in the printer 10A.

(Correspondence Relationships)

The flat-rate service is an example of "service related to a printer". The user name is an example of "user identification information". The plan registration request is an example of "service request". The starter cartridges 18A and 18B are examples of "first type of cartridge". The first to fourth discounts are examples of "first benefit". The general cartridge 18C is an example of "second type of cartridge". The fifth discount and the sixth discount are examples of "second benefit". The energization time information EI is an example of "time information". The energization time is an example of "utility time". The first predetermined time is an example of "predetermined time". Case C in FIGS. 6 and 7 is an example of "first case". Case A in FIGS. 3 and 4 is an example of "second case". The new contract request in T32 of FIG. 3 is an example of "initial application information". The device switching request in T432 of FIG. 6 is an example of "reapplication information". Case A in FIGS. 3 and 4 is an example of "third case". Case C in FIGS. 6 and 7 is an example of "fourth case". The device ID is an example of "printer identification information". The applicable discount information in the history table 242 is an example of "benefit history information".

T22 in FIG. 3, T92 in FIG. 4, and T492 in FIG. 7 are examples of "receive, from a terminal device, user identification information and a service request". T72 in FIG. 4, T272 in FIG. 5, and T472 in FIG. 7 are examples of "receive, from the printer, cartridge information". T124 in FIGS. 4 and T524 in FIG. 7 are examples of "grant a first benefit to a user".

(Modification 1) The server 200 may comprise a single server or a plurality of servers. For example, the server 200 may comprise a first server, a second server, and a third server. In this modification, the first server receives the login request from the terminal device 100 (T22 in FIG. 3), the second server receives the device information from the printer 10A (T72 in FIG. 4) and receives the plan registration request from the terminal device 100 (T92 in FIG. 4), and the third server grants the second discount to the user (T124 in FIG. 4).

(Modification 2) In the embodiment above, the printers 10A and 10B specify the type of cartridge, however, the server 200 may specify the type of cartridge. In this modification, the printers 10A and 10B each send device information including the cartridge number of the cartridge to the server 200 in T72 of FIG. 4, etc. The server 200 then specifies the types of cartridges by using the received cartridge numbers. In this modification, the cartridge numbers are examples of "cartridge information".

(Modification 3) The "first type of cartridge" is not limited to the starter cartridge which was packaged with a printer at the time of sale of the printer, but may be any cartridge so long as it was supplied with a printer at the time of sale of the printer, for example, a cartridge sold in a set with a printer.

(Modification 4) When the cartridge information indicates "general", a discount may not be granted to the user. In this modification, the cartridge conditions and the discount information D5 and D6 can be omitted in the discount table 240. In this modification, "grant a second benefit" can be omitted.

(Modification 5) The same discount may be granted to the user regardless of whether the time indicated by the energization time information EI is less than the first predetermined time or the time indicated by the energization time information EI is greater than or equal to the first predetermined time. In this modification, the energization time conditions, one of the discount information DI1 and DI2, and one of the discount information DI3 and DI4 can be omitted in the discount table 240. In another modification, a discount granted when the time indicated by the energization time information EI is greater than or equal to the first predetermined time may be larger than a discount granted when the time indicated by the energization time information EI is less than the first predetermined time.

(Modification 6) The printer 10A may store information indicating a time that elapsed since the printer 10A was turned on for the first time or information indicating an accumulated time when the printer 10A is not in a power-saving mode (i.e., the printer 10A is in a normal operation mode), instead of the energization time information EI.

(Modification 7) The same discount may be granted to the user regardless of whether the application is the initial application for the flat-rate service or the second application for the flat-rate service due to printer replacement. In this modification, the application conditions, one of the discount information DI1, DI2 and DI3, DI4, and one of the discount information DI5 and DI6 can be omitted in the discount table 240. In another modification, a discount granted when the application is the second application for the flat-rate service due to printer replacement may be larger than a discount granted when the application is the initial application for the flat-rate service.

(Modification 8) The server 200 may not store the history table 242. For example, the server 200 may grant a discount to the user when the second or subsequent application for the flat-rate service not due to printer replacement is made after a relatively long time (e.g., six months) since the contract to receive the flat-rate service was cancelled.

(Modification 9) The "first benefit" and "second benefit" are not limited to discounts but may be grant of points to the user.

(Modification 10) In the embodiment above, the processes of FIGS. 3 to 8 are implemented by software (e.g., the programs 36, 236), however, at least one of these processes may be implemented by hardware such as a logic circuit, etc.

What is claimed is:

1. A non-transitory computer-readable recording medium storing computer-readable instructions for a server that provides a service related to a printer,
    wherein the computer-readable instructions, when executed by a processor of the server, cause the server to:
    receive, from a terminal device, user identification information and a service request for requesting that provision of the service be started;
    receive, from the printer, cartridge information indicating a type of a cartridge currently attached in the printer;
    in a case where the user identification information and the service request are received from the terminal device and the cartridge information indicates a first type of cartridge that was supplied with the printer at time of sale of the printer, grant a first benefit to a user identified by the user identification information, the first benefit being a first discount associated with the first type of cartridge, wherein in a case where the user identification information and the service request are received from the terminal device and the cartridge information indicates a second type of cartridge that was not supplied with the printer at the time of sale of the printer, the first benefit is not granted.

2. The non-transitory computer-readable recording medium as in claim 1, wherein
    the computer-readable instructions, when executed by the processor, further cause the server to:
    in the case where the user identification information and the service request are received from the terminal device and the cartridge information indicates the second type of cartridge, grant a second benefit that is smaller than the first benefit to the user, the second benefit being a second discount associated with the second type of cartridge.

3. The non-transitory computer-readable recording medium as in claim 1, wherein
    the cartridge information and time information that indicates a utility time of the printer since the printer was purchased are received from the printer,
    wherein in a first case where the user identification information and the service request are received from the terminal device, the cartridge information indicates the first type of cartridge, and the time information indicates that the utility time is less than a predetermined time, the first benefit that is greater than the first benefit of a second case is granted to the user, and in the second case where the user identification information and the service request are received from the terminal device, the cartridge information indicates the first type of cartridge, and the time information indicates that the utility time is greater than or equal to the predetermined time, the first benefit that is smaller than the first benefit of the first case is granted to the user.

4. The non-transitory computer-readable recording medium as in claim 1, wherein in a third case where the user identification information and the service request are received from the terminal device, the cartridge information indicates the first type of cartridge, and initial application information is received from the terminal device, the first benefit that is greater than the first benefit of a fourth case is granted to the user, wherein the initial application information indicates an initial application for the service, and in the fourth case where the user identification information and the service request are received from the terminal device, the cartridge information indicates the first type of cartridge, and reapplication information is received from the terminal device, the first benefit that is smaller than the first benefit of the third case is granted to the user, wherein the reapplication information indicates a second or subsequent application for the service due to printer replacement.

5. The non-transitory computer-readable recording medium as in claim 1, wherein the cartridge information and printer identification information identifying the printer are received from the printer, wherein in a case where the user identification information and the service request are received from the terminal device, the cartridge information indicates the first type of cartridge, and benefit history information indicating that the first benefit has been granted in the past is not stored in a memory of the server in association with the printer identification information, the first benefit is granted to the user, and in a case where the user identification information and the service request are received from the terminal device, the cartridge information indicates the first type of cartridge, and the benefit history information is stored in the memory in association with the printer identification information, the first benefit is not granted.

6. The non-transitory computer-readable recording medium as in claim 1, wherein the first benefit is granted to the user by causing the server to store first benefit information indicating the first benefit in a memory of the server in association with the user identification information.

7. The non-transitory computer-readable recording medium as in claim 1, wherein the service is a charging service of charging an amount depending on a number of printed sheets printed by the printer, and the first discount is related to a discount on an amount charged to the user.

8. A method executed by a server that provides a service related to a printer, the method comprising:

receiving, from a terminal device, user identification information and a service request for requesting that provision of the service be started;

receiving, from the printer, cartridge information indicating a type of a cartridge currently attached in the printer;

in a case where the user identification information and the service request are received from the terminal device and the cartridge information indicates a first type of cartridge that was supplied with the printer at time of sale of the printer, granting a first benefit to a user identified by the user identification information, the first benefit being a first discount associated with the first type of cartridge, wherein in a case where the user identification information and the service request are received from the terminal device and the cartridge information indicates a second type of cartridge that was not supplied with the printer at the time of sale of the printer, the first benefit is not granted.

9. A server providing a service related to a printer, the server comprises:

a controller configured to:

receive, from a terminal device, user identification information and a service request for requesting that provision of the service be started;

receive, from the printer, cartridge information indicating a type of a cartridge currently attached in the printer;

in a case where the user identification information and the service request are received from the terminal device and the cartridge information indicates a first type of cartridge that was supplied with the printer at time of sale of the printer, grant a first benefit to a user identified by the user identification information, the first benefit being a first discount associated with the first type of cartridge, wherein in a case where the user identification information and the service request are received from the terminal device and the cartridge information indicates a second type of cartridge that was not supplied with the printer at the time of sale of the printer, the first benefit is not granted.

* * * * *